United States Patent [19]
Fukushiro et al.

[11] Patent Number: 5,850,510
[45] Date of Patent: Dec. 15, 1998

[54] INTERPRETER LANGUAGE PROCESSING DEVICE

[75] Inventors: Masayuki Fukushiro, Kawasaki; Daijoh Nakayama, Inagi, both of Japan

[73] Assignee: Fujitsu Limited, Kawasaki, Japan

[21] Appl. No.: 841,358

[22] Filed: Apr. 23, 1997

Related U.S. Application Data

[63] Continuation of Ser. No. 517,291, Aug. 21, 1995, abandoned.

[30] Foreign Application Priority Data

Dec. 28, 1994 [JP] Japan .................................. 6-326886

[51] Int. Cl.⁶ .................................................. G06F 11/00
[52] U.S. Cl. .............................. 395/183.14; 391/183.11; 391/185.04
[58] Field of Search ........................ 395/183.14, 183.13, 395/183.11, 185.01, 183.18, 392, 185.04

[56] References Cited

U.S. PATENT DOCUMENTS

| | | | |
|---|---|---|---|
| 4,819,233 | 4/1989 | Delucia et al. | 395/813.14 |
| 5,021,948 | 6/1991 | Nakayama et al. | 364/200 |
| 5,050,168 | 9/1991 | Paterson | 395/813.14 |
| 5,132,972 | 7/1992 | Hansen | 395/183.14 |
| 5,142,679 | 8/1992 | Owaki et al. | 395/183.14 |
| 5,293,385 | 3/1994 | Hary | 395/183.14 |
| 5,319,645 | 6/1994 | Bassi et al. | 395/183.14 |
| 5,428,754 | 6/1995 | Baldwin | 395/375 |

FOREIGN PATENT DOCUMENTS

| | | | |
|---|---|---|---|
| 1 334 122 | 10/1973 | United Kingdom | G06F 11/04 |
| 2 017 362 | 10/1979 | United Kingdom | G06F 11/04 |
| 2 217 061 | 10/1989 | United Kingdom | G06F 11/30 |

*Primary Examiner*—Joseph Palys
*Attorney, Agent, or Firm*—Staas & Halsey

[57] ABSTRACT

A device for executing a main program written in an interpreter language includes a processing unit for executing a program written in the interpreter language and a monitor program which is written in the interpreter language for monitoring the execution of the main program. The device further includes a first switching unit for switching the processing unit from executing the main program to executing the monitor program after an execution of one execution unit of the main program, and a second switching unit for switching the processing unit from executing the monitor program to executing the main program after an execution of the monitor program.

11 Claims, 13 Drawing Sheets

IF CURRENT LINE = n THEN STOP    ①

IF A IS CHANGED THEN
   PRINT A$
   STOP
END IF    ②

- 
- 
-

IF CURRENT LINE = n THEN
   PRINT A$
   STOP    ③

- 
- 
-

F I G. 1 1
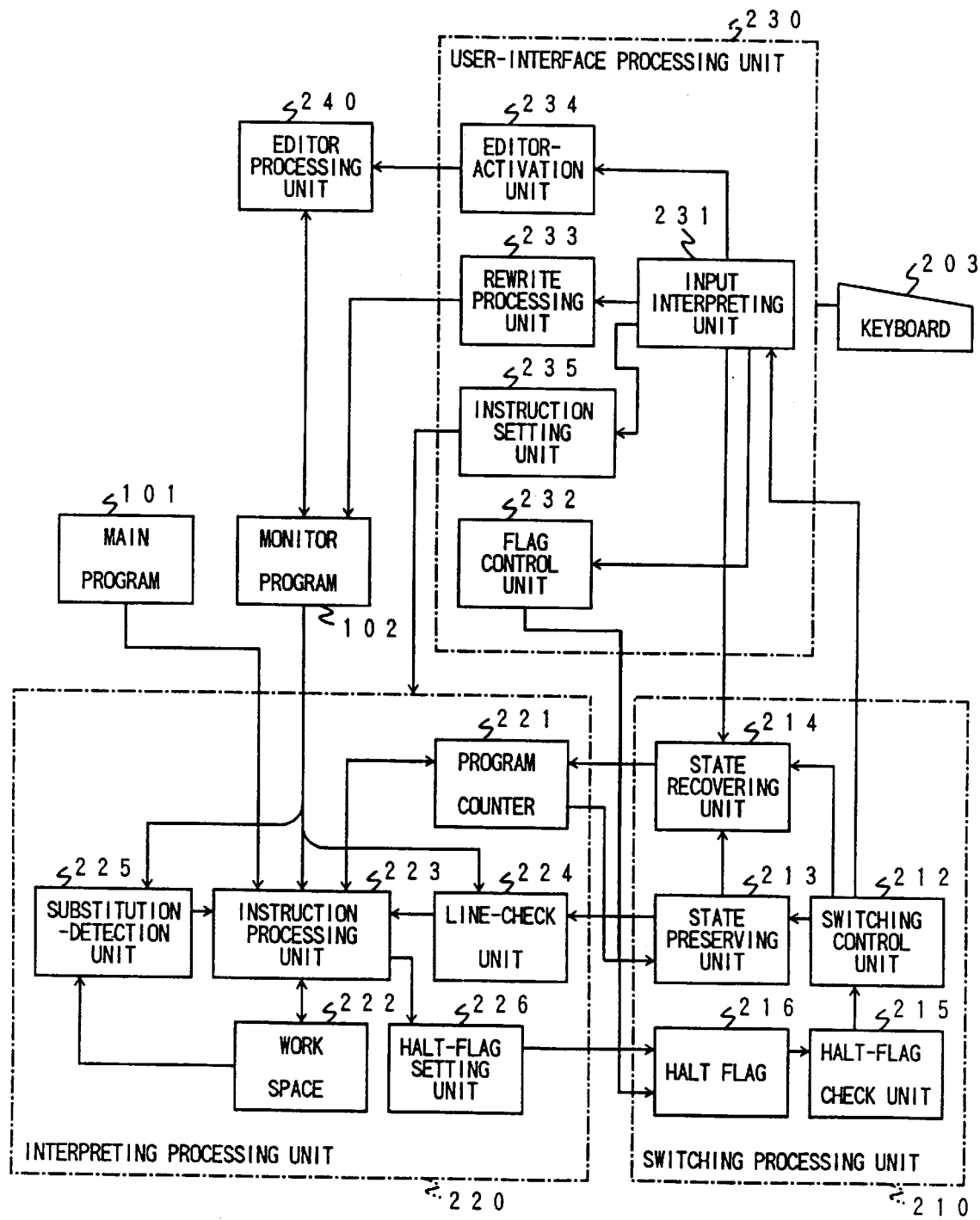

INTERPRETER LANGUAGE PROCESSING DEVICE

This application is a continuation of application Ser. No. 08/517,291, filed Aug. 21, 1995, now abandoned.

BACKGROUND OF THE INVENTION

1. Field of the Invention

The present invention generally relates to interpreter language processing devices, and particularly relates to an interpreter language processing device for interpreting and executing programs written in an interpreter language.

2. Description of the Related Art

When developing complex programs by using an interpreter language, an interpreter language processing device is required to possess debug functions which enable an easy detection of logical errors appearing in programs.

In the related art, an interpreter language processing device shown in FIG. 1 includes a main interpreting unit 510 for interpreting and executing main programs 101. Also, the interpreter language processing device includes a debug processing unit 520, which is relatively small in its size, for interpreting and executing a simple set of instructions provided for debugging purposes.

In the interpreter language processing device of FIG. 1, a monitor program 502 for the debugging purposes is written in advance by using the simple set of instructions. Each time the main interpreting unit 510 executes one execution unit (e.g., one line) of the main program 101, a switching processing unit 530 activates a debug processing unit 520. Then, the debug processing unit 520 in turn executes the monitor program 502 to debug the main program 101.

In this configuration of the interpreter language processing device, only a small number of instructions is sufficient for the debugging purposes, so that the debug processing unit 520 can be made in a simple structure. Thus, a processing time required for program interpretation can be short, yet the interpreter language processing device can provide high-speed processing.

Increases in the complexity of programs in recent years have resulted in the demand for more complex debug functions in order to find a logical flaw in programs. It is becoming more difficult for the simple instructions provided for the monitor program of the related art to provide sufficient functions to meet this demand.

If the number of instructions used in the monitor program is allowed to be increased, a monitor program having a variety of functions can be constructed. However, an increase in the number of instructions will lead to an increased structural complexity of the debug processing unit 520. This means that a program size of the debug processing unit 520 will also have to become larger, and so will the total program size of the interpreter language processing device.

Accordingly, there is a need in the field of the interpreter language processing device for an interpreter language processing device which provides a variety of debug functions without substantially increasing the total program size of the device.

SUMMARY OF THE INVENTION

Accordingly, it is a general object of the present invention to provide an interpreter language processing device which can satisfy the need described above.

It is another and more specific object of the present invention to provide an interpreter language processing device which provides a variety of debug functions without substantially increasing a total program size of the device.

In order to achieve the above objects, a device for executing a main program written in an interpreter language according to the present invention includes a processing unit for executing a program written in the interpreter language, a monitor program which is written in the interpreter language for monitoring an execution of the main program, a first switching unit for switching the processing unit from executing the main program to executing the monitor program after an execution of one execution unit of the main program, and a second switching unit for switching the processing unit from executing the monitor program to executing the main program after an execution of the monitor program.

In the device described above, the monitor program is written in the same interpreter language as that of the main program, so that the same processing unit can be used for executing both the main program and the monitor program one at a time. Thus, the total program size of the device is prevented from increasing substantially. Also, various functions provided for the interpreter language makes it possible to carry out detailed debugging analysis of complex programs.

Other objects and further features of the present invention will be apparent from the following detailed description when read in conjunction with the accompanying drawings.

BRIEF DESCRIPTION OF THE DRAWINGS

FIG. 7 is an illustrative drawing showing an example of a monitor program used in the interpreter language processing device of FIG. 6;

FIG. 11 is a block diagram of a fourth embodiment of the interpreter language processing device according to the second principle;

DESCRIPTION OF THE PREFERRED EMBODIMENTS

In the following, principles of the present invention will be described first with reference to FIG. 2 and FIG. 3.

Figure 2:
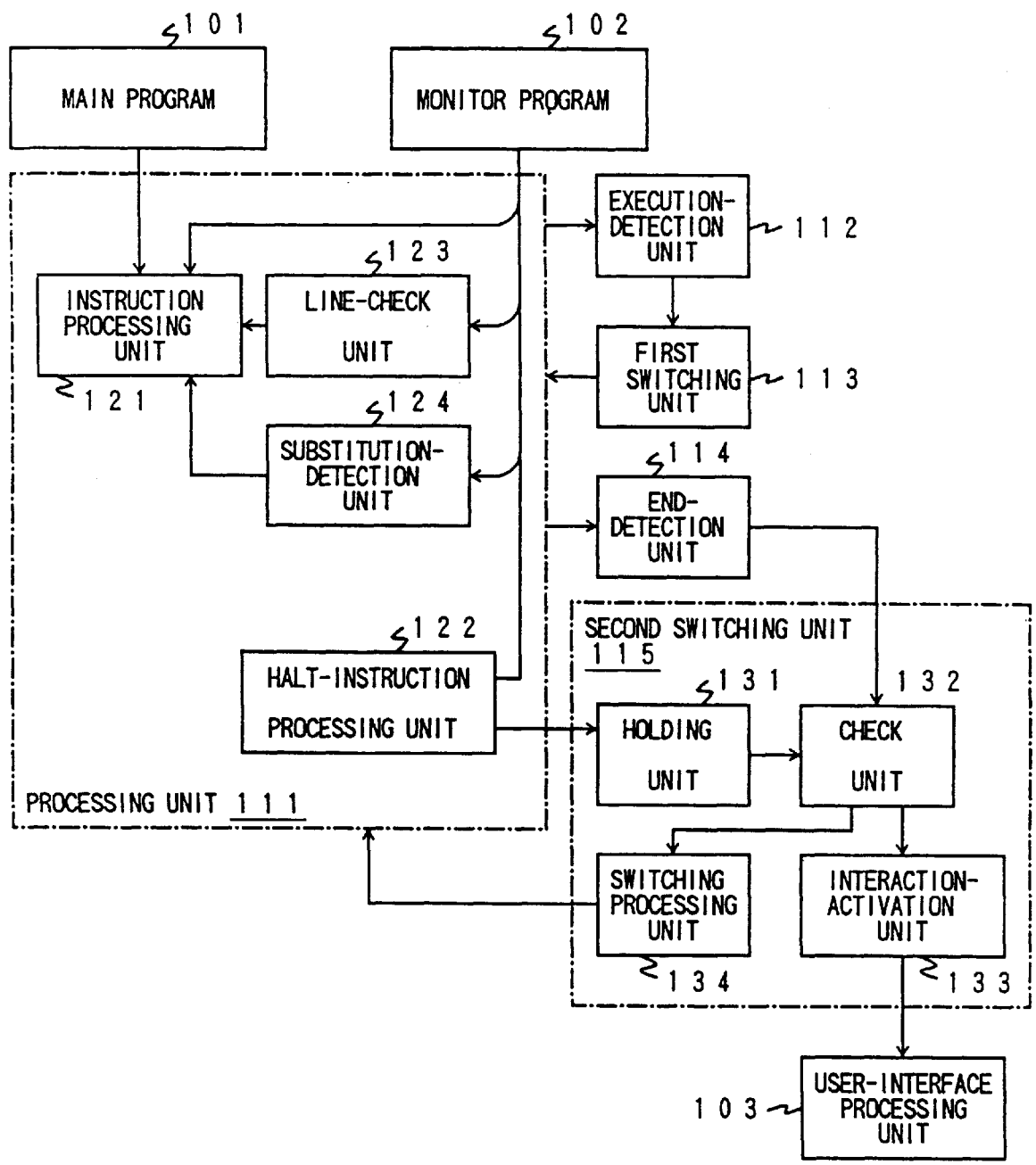
FIG. 2 is a block diagram of an interpreter language processing device according to a first principle of the present invention.

FIG. 2 shows a block diagram of an interpreter language processing device according to a first principle of the present invention. In FIG. 2, the interpreter language processing device includes the main program 101, a monitor program 102, a user-interface processing unit 103, a processing unit 111, an execution-detection unit 112, a first switching unit 113, an end-detection unit 114, and a second switching unit 115.

The processing unit 111 includes an instruction processing unit 121, a halt-instruction processing unit 122, a line-check unit 123, and a substitution-detection unit 124. The second switching unit 115 includes a holding unit 131, a check unit 132, an interaction-activation unit 133, and a switching processing unit 134.

The processing unit 111 receives the main program 101 written in an interpreter language, and interprets each instruction of the main program 101. The monitor program 102 is written in the interpreter language, and helps in the debugging of the main program 101. The execution-detection unit 112 sends an execution message when one execution unit of the main program 101 is executed. Upon receiving the execution message, the first switching unit 113 makes the processing unit 111 switch from an execution of the main program 101 to an execution of the monitor program 102. The end-detection unit 114 sends an end message upon the end of the execution of the monitor program 102. Upon receiving the end message, the second switching unit 115 makes the processing unit 111 switch from an execution of the monitor program 102 to an execution of the main program 101.

Since both the main program 101 and the monitor program 102 are written in the same interpreter language, a single processing unit, i.e., the processing unit 111, can interpret and execute both the main program 101 and the monitor program 102 one at a time.

In FIG. 2, the instruction processing unit 121 interprets and executes instructions written in the interpreter language. The halt-instruction processing unit 122 sends a halt message for halting the execution of the main program 101 in response to a halt instruction written in the monitor program 102. When receiving the halt message, the holding unit 131 retains the halt message. After receiving the end message, the check unit 132 determines whether the holding unit 131 is holding the halt message. If the holding unit 131 is holding the halt message, the interaction-activation unit 133 activates the user-interface processing unit 103 to start interaction with a user. If the holding unit 131 is not holding the halt message, the switching processing unit 134 makes the processing unit 111 switching from the execution of the monitor program 102 to the execution of the main program.

Accordingly, when the halt instruction in the monitor program 102 is executed, the user-interface processing unit 103 is activated at the end of an execution of the monitor program 102. In doing so, the processing of the main program 101 is temporarily stopped.

In response to a line-check instruction in the monitor program 102, the line-check unit 123 obtains a line number indicating a line in the main program 101 which has just been executed by the processing unit 111. Then, the line-check unit 123 sends the line number to the instruction processing unit 121. In response to a substitution-detection instruction in the monitor program 102, the substitution-detection unit 124 obtains identification information identifying variables whose values have just been modified by the execution of an instruction in the main program 101. Then, the substitution-detection unit 124 sends the identification information to the instruction processing unit 121.

The line-check function described above cooperates with the halt function described above and with a branch-on-condition function which is usually provided in an ordinary interpreter language. Based on this cooperation, a break-point function by which the main program 101 is halted at a specified line number can be provided.

The substitution-detection function described above cooperates with the halt function and the branch-on-condition function. This cooperation can provide a watch-point function by which the execution of the main program 101 is halted when a value of a specified variable is changed.

Figure 3:
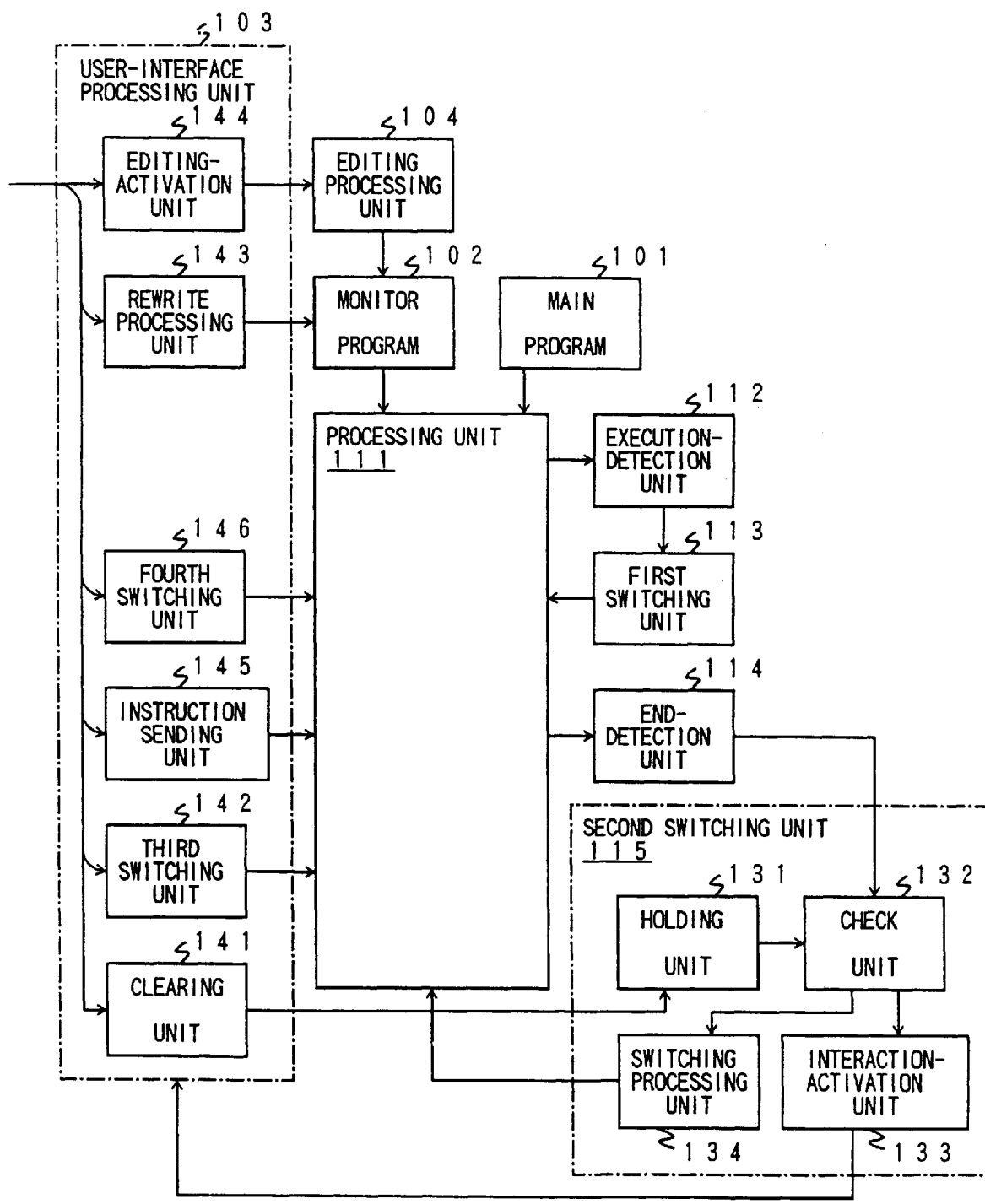
FIG. 3 is a block diagram of an interpreter language processing device according to a second principle of the present invention.

FIG. 3 shows a block diagram of an interpreter language processing device according to a second principle of the present invention. In FIG. 3, the interpreter language processing device includes an editing processing unit 104 in addition to the elements shown in FIG. 2. The same elements as those in FIG. 2 are referred to by the same numerals, and a description thereof will be omitted.

In FIG. 3, the user-interface processing unit 103 includes a clearing unit 141, a third switching unit 142, a rewrite processing unit 143, an editing-activation unit 144, an instruction sending unit 145, and a fourth switching unit 146.

The clearing unit 141 clears the holding unit 131 on request from the user for resuming the execution of the main program 101. In response to the same request, the third switching unit 142 makes the processing unit 111 switching to the execution of the main program 101.

Accordingly, the processing unit 111 can return to the execution of the main program 101 when the user wishes so.

The rewrite processing unit 143 modifies the monitor program 102 according to commands given by the user with regard to modifications.

Accordingly, the user can modify the monitor program 102 by checking the state of the program being executed after starting the execution of the main program 101.

The editing processing unit 144 is provided to help in the writing of monitor programs. The editing-activation unit 144 activates the editing processing unit 104 in response to an editor-activation command given by the user.

Accordingly, the user can modify the monitor program 102 in the same manner as editing text documents.

The instruction sending unit 145 receives an immediate-execution command and an instruction to be executed by the immediate-execution command. Then, the instruction sending unit 145 sends the processing unit 111 the instruction to be executed.

Accordingly, the user can execute a command by issuing the immediate-execution command while the execution of the main program 101 is being halted.

The fourth switching unit 146, in response to a predetermined execution command, makes the processing unit 111 switching to an execution of the main program 101. When the fourth switching unit 146 operates, the holding unit 131 keeps retaining the halt message.

Accordingly, after the execution unit of the main program 101 and the monitor program 102 are executed, the control is returned to the user-interface processing unit 103 by the operation of the interaction-activation unit 133.

In the following, embodiments of the present invention will be described with reference to the accompanying drawings.

Figure 4:
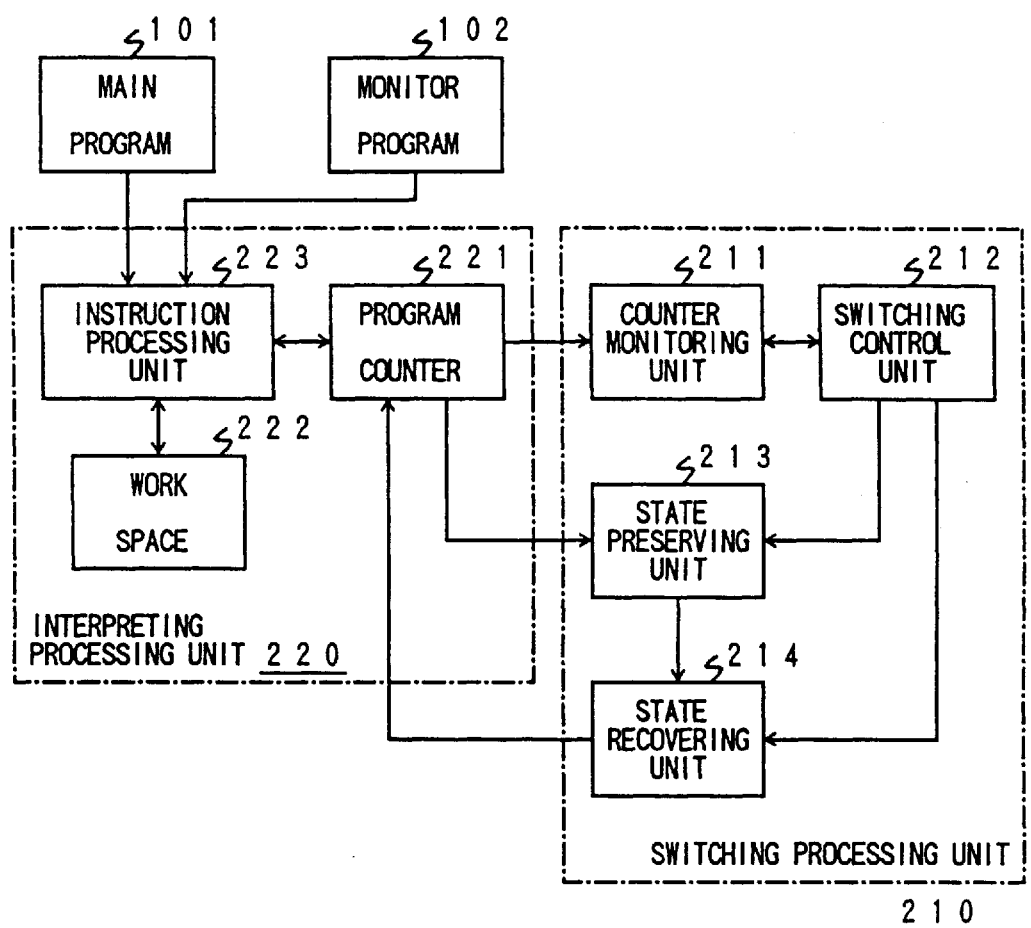
FIG. 4 is a block diagram of a first embodiment of the interpreter language processing device according to the first principle.

FIG. 4 shows a block diagram of a first embodiment of an interpreter language processing device according to the first principle. The first embodiment of the interpreter language processing device is implemented on a computer system.

In FIG. 4, the interpreter language processing device includes a switching processing unit 210, an interpreting processing unit 220, the main program 101, and the monitor program 102. The interpreting processing unit 220 includes a program counter 221, a work space 222, and an instruction processing unit 223. The switching processing unit 210 includes a counter monitoring unit 211, a switching control unit 212, a state preserving unit 213, and a state recovering unit 214.

Figure 1:
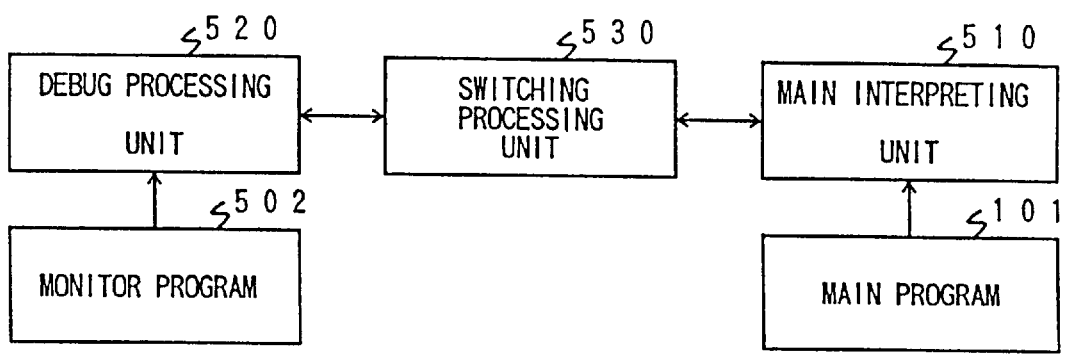
FIG. 1 is a block diagram of an interpreter language processing device of the related art.

In the interpreter language processing device, the interpreting processing unit 220, which is similar to the main interpreting unit 510 of FIG. 1, interprets and executes the main program 101 and the monitor program 102 in turn, according to an instruction provided from the switching processing unit 210. The interpreting processing unit 220 corresponds to the processing unit 111 of FIG. 2. In the interpreting processing unit 220, the program counter 221 indicates an address of an instruction which is being executed, and the work space 222 stores values of defined variables. Also, the instruction processing unit 223, which corresponds to the instruction processing unit 121 of FIG. 2, executes an instruction stored in the address indicated by the program counter 221.

In switching processing unit 210, the counter monitoring unit 211 monitors the program counter 221, and detects a specific condition thereof which is indicated by the switching control unit 212. The switching control unit 212 determines this specific condition according to a mode in which the interpreter language processing device is operating. There are two modes, i.e., a mode 1 corresponding to the execution of the main program 101 and a mode 2 corresponding to the execution of the monitoring program 102.

In the mode 1, the switching control unit 212 instructs the counter monitoring unit 211 to detect an increment of the program counter 221. In the mode 2, the switching control unit 212 instructs the counter monitoring unit to detect the end of the execution of the monitor program 102. At the start of its operation, the switching control unit 212 is set to the mode 1, which corresponds to the execution of the main program.

In FIG. 4, the state preserving unit 213 and the state recovering unit 214 store and recover, respectively, the content of the program counter 221. Both the state preserving unit 213 and the state recovering unit 214 operate according to instructions provided from the switching control unit 212.

The switching control unit 212 instructs the state preserving unit 213 to preserve the content of the program counter 221 when a mode is switched from the mode 1 to the mode 2. When a mode is switched from the mode 2 to the mode 1, on the other hand, the switching control unit 212 instructs the state recovering unit 214 to recover the content of the program counter 221. Also, the state preserving unit 213 sets the program counter 221 to the starting address of the monitor program 102 after preserving the content of the program counter 221.

Figure 5:
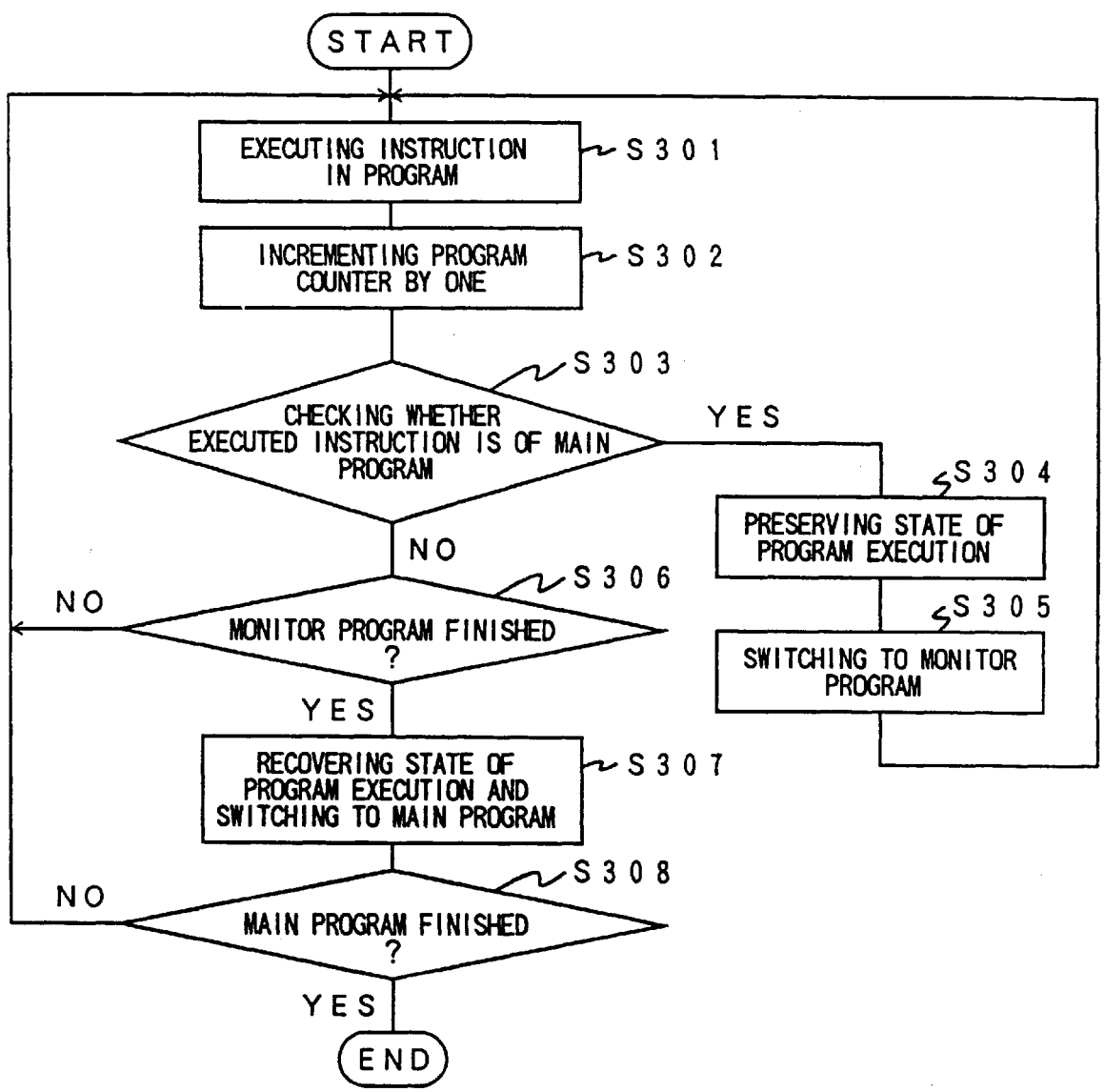
FIG. 5 is a flowchart of a process of the interpreter language processing device of FIG. 4.

FIG. 5 shows a flowchart of a process of the interpreter language processing device of FIG. 4. As mentioned above, the switching control unit 212 is set to the mode 1 at the initial condition.

At a step S301, the first line of the main program is executed. At a step S302, the program counter 221 is incremented by 1, which is notified to the switching control unit 212 by the counter monitoring unit 211.

At a step S303, a check is made whether the executed instruction is that of the main program 101. If it is, the procedure goes to a step S304. At the step S304, the switching control unit 212 sends an instruction to the state preserving unit 213, which in turn stores the content of the program counter 221. At a step S305, the switching control unit 212 switches to the mode-2 operation, and sets the program counter 221 to the starting address of the monitor program 102. Then, the procedure goes back to the step S301.

In this case, an instruction executed at the step S301 is that of the monitor program 102. In this manner, the program execution is switched from the main program 101 to the monitor program 102.

If it turns out at the step S303 that the monitor program 102 is being executed, the procedure goes to a step S306. At the step S306, the counter monitoring unit 212 monitors whether the execution of the monitor program 102 is finished. In this manner, the step S301 to the step S303 are repeated until the monitor program 102 is finished.

When the counter monitoring unit 211 detects the end of the execution of the monitor program 102, the procedure goes to a step S307.

At the step S307, the switching control unit 212 switches from the mode 2 to the mode 1, and, also, instructs the state recovering unit 214 to engage in the recovering operation. In response, the state recovering unit 214 reads out the address from the state preserving unit 213, which address indicates an instruction in the main program 101 to be executed. Then, the state recovering unit 214 writes the address into the program counter 221 to recover the state of the program 101 to be executed.

At a step S308, a check is made whether the content of the program counter 221 indicates the end of the main program 101. If it does not, the procedure goes back to the step S301 to execute the next instruction of the main program 101. If the content of the program counter 221 indicates the end of the main program 101, the procedure ends.

Namely, when the execution of the monitor program 102 following the execution of the last instruction of the main program 101 is finished, the end of the main program 101 is indicated after recovering the content of the program counter 221. Thus, the procedure ends with an affirmative answer obtained at the step S308.

In this manner, the switching control unit 212 controls the operation of the counter monitoring unit 211 such that the program execution can be switched from the monitor program 102 to the main program 101 at the end of the monitor program 102.

As described above, the switching control unit 212 controls the counter monitoring unit 211 while switching from one mode to the other in response to the monitoring result of the counter monitoring unit 211. Thus, the functions of the execution-detection unit 112 and the end-detection unit 114 of FIG. 2 are provided. Also, based on the monitoring result of the counter monitoring unit 211, the switching control unit 212 controls the state preserving unit 213 and the state recovering unit 214. Thus, the functions of the first switching unit 113 and the second switching unit 115 are provided.

Namely, the interpreting processing unit 220 can switch from the execution of the main program 101 to the execution of the monitor program 102 each time one line of the main program 101 is executed. Also, the interpreting processing unit 220 can switch from the execution of the monitor program 102 to the execution of the main program 101 after the monitor program 102 has finished being executed.

As described above, according to the first principle of the present invention, both the main program 101 and the monitor program 102 are executed by a single unit, i.e., the interpreting processing unit 220. Thus, there is no need to provide an interpreting processing unit which is specifically designed for the debugging purposes. This can prevent the total program size of the interpreting language processing device from becoming substantially large.

Also, since the monitor program 102 can be written in the same programming language as that of the main program 101, a variety of functions provided in the interpreter language can be used for the monitor program 102. Thus, the debug functions are brought to a point of full satisfaction for the user.

Furthermore, programmers can create the monitor program 102 by using an interpreter language, which is familiar to them from their experience in the development of the main program 101. Thus, efficiency in the program development can be enhanced.

The interpreting processing unit 220 and the switching processing unit 210 of the first embodiment can be provided with a variety of additional functions which are useful for the debugging purposes. In the following, embodiments in which a debug environment is augmented with additional debug functions will be described.

Figure 6:
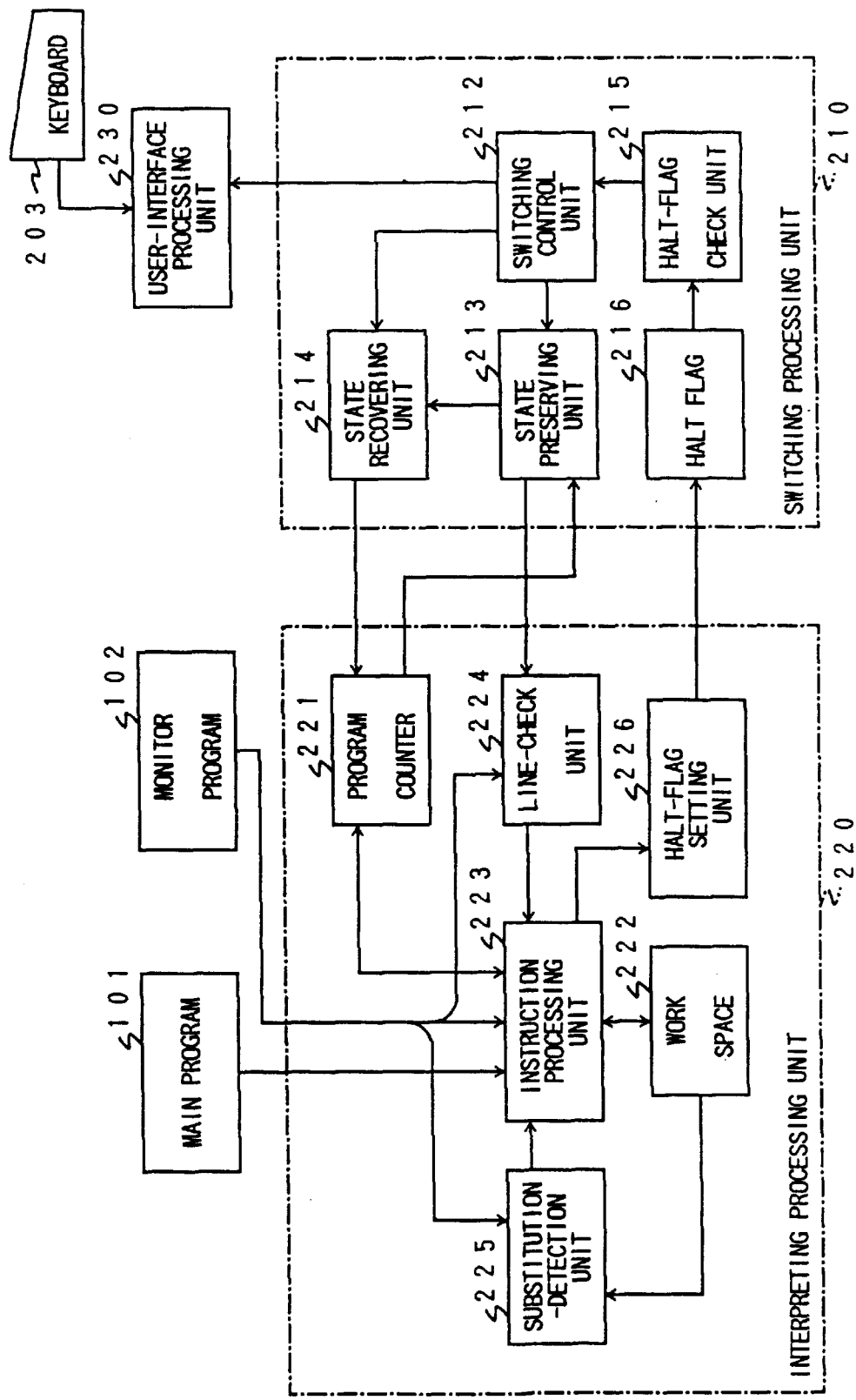
FIG. 6 is a block diagram of a second embodiment of the interpreter language processing device according to the first principle.

FIG. 6 shows a block diagram of a second embodiment of the interpreter language processing device according to the first principle. The second embodiment of the interpreter language processing device is implemented on a computer system. In FIG. 6, the same elements as those in FIG. 4 are referred to by the same numerals, and a description thereof will be omitted.

In FIG. 6, the interpreter language processing device includes a user-interface processing unit 230 and a keyboard 203. Also, the switching processing unit 210 of the interpreter language processing device includes a halt-flag check unit 215 and a halt flag 216. The halt-flag check unit 215 checks whether the halt flag 216 is marked or not. Based on the check, the switching control unit 212 activates the user-interface processing unit 230.

In FIG. 6, the interpreting processing unit 220 of the interpreter language processing device includes a line-check unit 224, a substitution-detection unit 225, and a halt-flag setting unit 226. These units perform processes corresponding to a line-check instruction, a substitution-detection instruction, and a halt instruction used in the monitor program 102.

The line-check unit 224 corresponds to the line-check unit 123 of FIG. 2. The line-check unit 224 accesses the state-preserving unit 213 in response to the line-check instruction to obtain a line number being executed within the main program 101. Then, the line-check unit 224 sends the line number to the instruction processing unit 223.

The substitution-detection unit 225 corresponds to the substitution detection unit 124 of FIG. 2. The substitution-detection unit 225 accesses the work space 222 to check if a specified variable has changed its value. Then, substitution-detection unit 225 sends a result of the check to the instruction processing unit 223.

For example, the work space 222 may contain a table listing substitution flags, which correspond to each variable name. When the instruction processing unit 223 executes an instruction for substituting a value to a variable, a substitution flag corresponding to this variable may be marked. In this case, the substitution-detection unit 225 can check if a specified variable has changed its value, by simply checking a corresponding substitution flag. Here, if only a latest change in variable values is to be detected, the substitution-detection unit 225 must clear all the substitution flags in that table.

The halt-flag setting unit 226 corresponds to the halt-instruction processing unit 122 of FIG. 2. The halt-flag setting unit 226 sets the halt flag 216 in response to the halt instruction. Here, the halt-flag 216 corresponds to the holding unit 131 of FIG. 2. The halt-flag check unit 215 checks if the halt flag 216 is marked (set) in response to an instruction from the switching control unit 212. Then, the halt-flag check unit 215 sends a result of the check to the switching control unit 212.

In this manner, the interpreting language processing device of the second embodiment can execute the monitor program 102 which contains the line-check instruction, the substitution-detection instruction, and the halt instructions.

FIG. 7 shows an example of the monitor program 102, which contains the line-check instruction "CURRENT LINE", the substitution-detection instruction "CHANGED", and the halt instructions "STOP". In this example, a line indicated as (1) means that the main program is stopped when a line with a line number "n" is executed. Lines indicated as (2) means that when a value of a variable A is changed, the main program is stopped after the value of the variable A is printed. Lines indicated as (3) means that when a line with the line number "n" is executed, the main program is stopped after the value of the variable A is printed.

Figure 8:
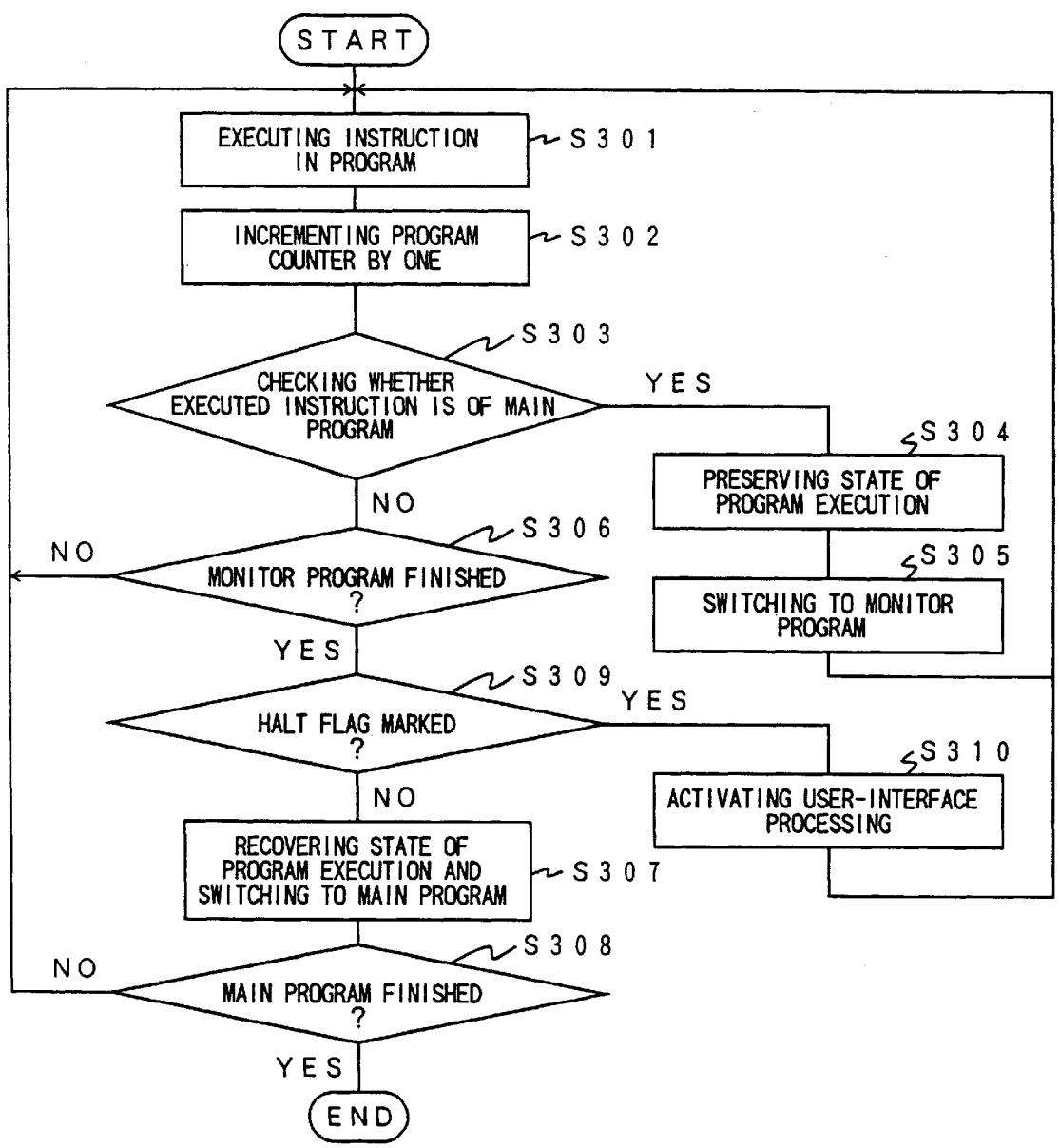
FIG. 8 is a flowchart of a process of the interpreter language processing device of FIG. 6.

FIG. 8 shows a flowchart of a process of the interpreting language processing device of the second embodiment. In FIG. 8, the steps S301 to S308 are the same as those of FIG. 5, and a description thereof will be omitted.

At a step S309 after the end of the execution of the monitor program 102, a check is made by the halt-flag check unit 215 whether the halt flag 216 is marked. If it is marked, the procedure goes to a step S310. Otherwise, the procedure goes to the step S307.

In the execution of the main program 101 for the debugging purposes, the halt flag 216 is more often unmarked than marked. This is because the halt instruction in the monitor program 102 is normally provided in combination with the branch-on-condition instruction and either of the line-check instruction or the substitution-detection instruction. Only when results of the line-check instruction or the substitution-detection instruction are true, the halt instruction is executed.

Thus, after the step S309, the procedure goes to the step S307 most of the time. At the step S307, the state of the program execution is recovered for the main program 101 in the same manner as in FIG. 5. That is, the switching control unit 212 instructs the state recovering unit 214 to recover the state of the program execution. Then, at the step S308, a check is made whether the execution of the main program 101 is finished. If it is not, the procedure goes back to the step S301 to execute the next instruction of the main program 101.

In this manner, the switching control unit 212 controls the state recovering unit 214 based on the result of the check made by the halt-flag check unit 215. The functions of the switching processing unit 134 of FIG. 2 are thus implemented such that the program execution returns to the main program 101 after the end of the monitor program 102.

Each line of the main program 101 and the monitor program 102 is executed in turn as described above until the halt flag 216 is set. Here, the halt flag may be set when the line number of an executed line becomes the specified line number or when the value of a specified variable is changed. As an example, a case in which a line number of an executed line becomes the specified line number will be described below.

After the program execution is switched to the monitor program 102, the monitor program 102 is executed at the step S301. When the line-check instruction in the monitor program 102 is executed, the line number detected by the line-check unit 224 is compared with the specified line number. If both line numbers are the same, the halt instruction may be executed as shown in the example of FIG. 7. In this case, the halt-flag setting unit 226 sets the halt flag 216 of the switching processing unit 210.

After the execution of the monitor program 102 is finished with the halt flag 216 being set, the procedure proceeds to the step S309. Since the halt flag 216 is set, the check at the step S309 returns an affirmative answer, leading the procedure to the step S310. At the step S310, the user-interface processing unit 230 is activated, where the switching control unit 212 operates as the interaction-activation unit 133 of FIG. 2

In this manner, the halt flag 216 which is set by the halt-flag setting unit 226 in response to the halt instruction written in the monitor program 102 stops the main program 101. In this example, the main program 101 is stopped at the line number specified in the monitor program 102 with the user-interface processing unit 230 providing the interaction function for the user.

The combination of the branch-on-condition instruction, line-check instruction, and the halt instruction in the monitor program 102 provides the break-point function. Here, the break-point function refers to a function by which the main program 101 is stopped at a specified line number.

Likewise, the combination of the branch-on-condition instruction, substitution-detection instruction, and the halt instruction in the monitor program provides the watch-point function. Here, the watch-point function refers to a function by which the main program 101 is stopped when a value of a specified variable is changed.

Furthermore, the break-point function and the watch-point function can be combined with other instructions provided in a conventional interpreter language. Such a combination provides a variety of debug functions which enables complex operations to be carried out. Thus, the work load of programmers is reduced by a significant amount.

As shown by the lines denoted as (3) in FIG. 7, for example, the break-point function combined with a print function provides such a complex function as printing a character string A$ before stopping the main program 101 at the line number n. In this example, the condition of equality "=" can be changed to the condition of inequality ">", for example. Then, the character string A$ will be printed before the main program 101 is stopped at each of the lines whose line number is larger than n.

In the following, the details of the interaction functions provided by the user-interface processing unit 230, along with a process of returning to the execution of the main program 101, will be described.

Figure 9:
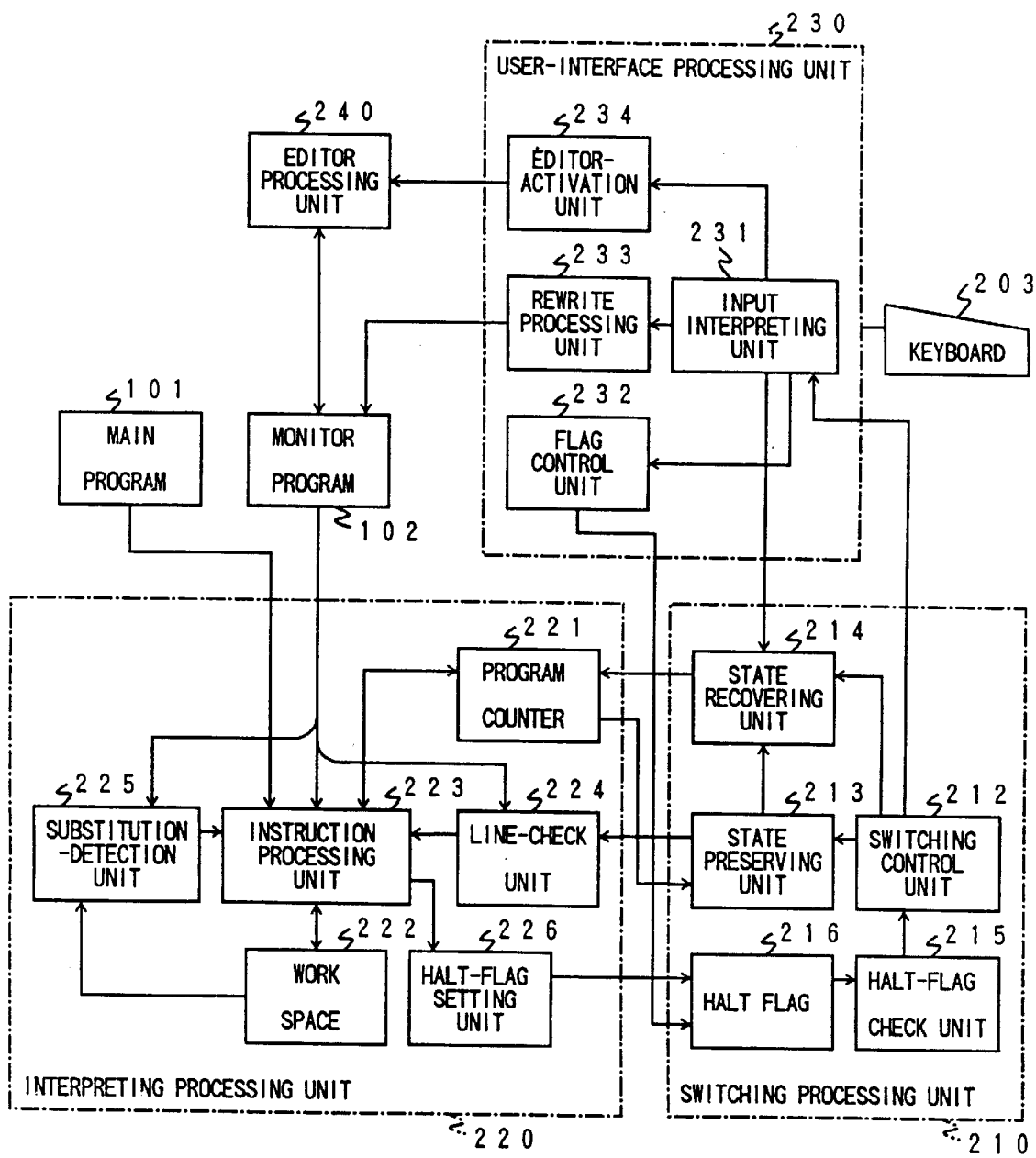
FIG. 9 is a block diagram of a third embodiment of the interpreter language processing device according to the second principle.

FIG. 9 shows a third embodiment of the interpreter language processing device according to the second principle. The third embodiment of the interpreter language processing device is implemented on a computer system. In FIG. 9, the same elements as those in FIG. 6 are referred to by the same numerals, and a description thereof will be omitted.

In FIG. 9, the interpreter language processing unit includes an editor processing unit 240. Also, the user-interface processing unit 230 of the interpreter language processing unit includes an input interpreting unit 231, a flag control unit 232, a rewrite processing unit 233, and an editor-activation unit 234.

The input interpreting unit 231 interprets commands given by the user via an input device such as the keyboard 203. These commands includes an addition command for adding instructions to the monitor program 102, a deletion command for deleting instructions from the monitor program 102, and a modification command for modifying the monitor program 102. The input interpreting unit 231 controls the rewrite processing unit 233 based on these commands. Also, the input interpreting unit 231 activates the editor-activation unit 234 in response to an editor-activation command given by the user.

Furthermore, the input interpreting unit 231 activates the flag control unit 232 in response to a restart command for resuming the execution of the main program 101. The flag control unit 232 when activated clears the halt flag 216 of the switching processing unit 210. At the same time, the input interpreting unit 231 activates the state recovering unit 213 of the switching processing unit 210 to recover the state of the program execution.

Figure 10:
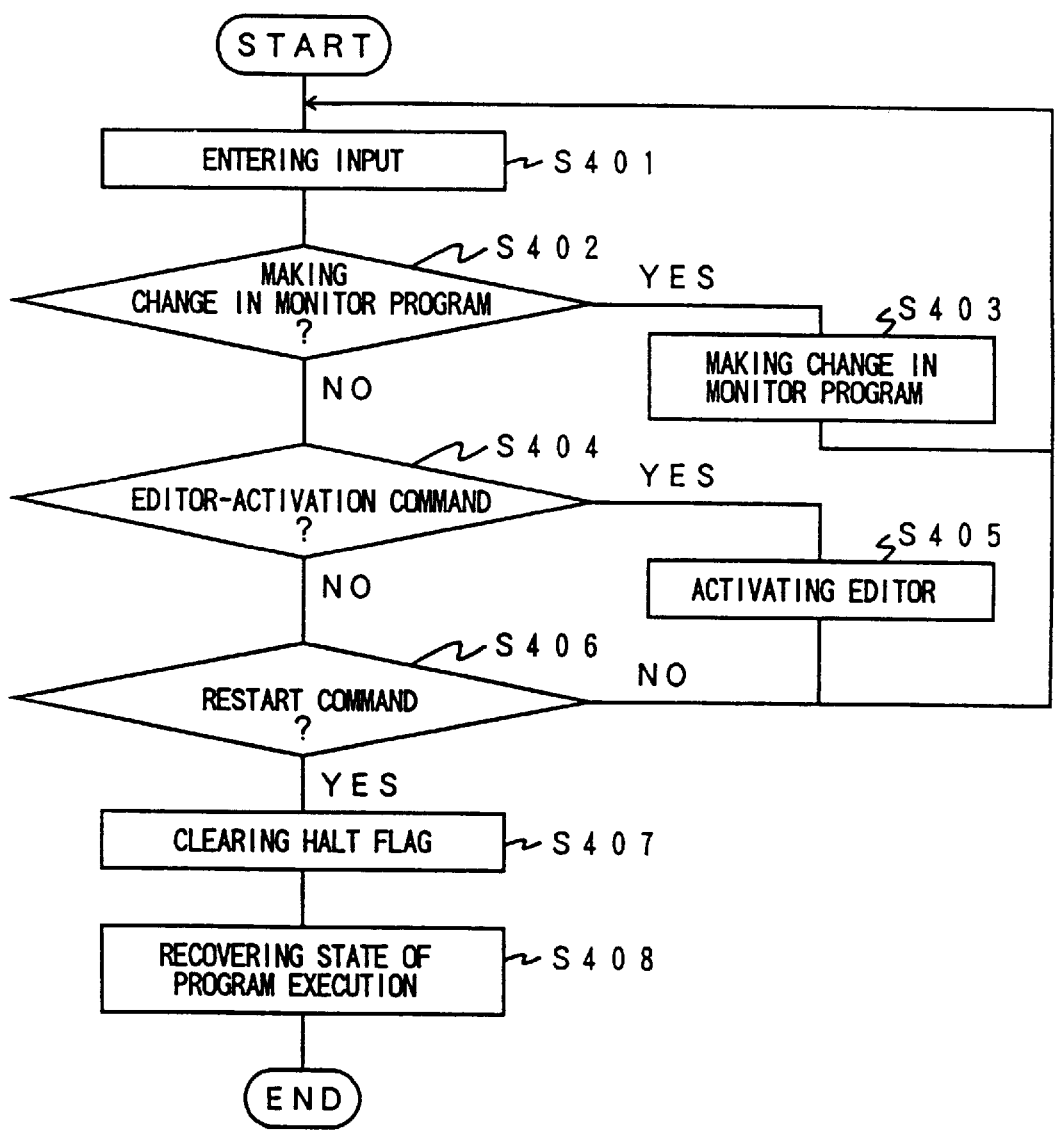
FIG. 10 is a flowchart of a process of the interpreter language processing device of FIG. 9.

FIG. 10 shows a flowchart of a process of the user-interface processing unit 230.

At a step S401, an input is entered by the user operating on the keyboard 203. At a step S402, a check is made whether the input is concerned with making a change in the monitor program 102. An answer to the check is affirmative if the addition command, the deletion command, or the modification command along with information necessary for an execution of one of these commands is entered at the step S401. In this case, the procedure goes to a step S403. At the step S403, the input interpreting unit 231 activates the rewrite processing unit 233 to make a change in the monitor program 102. After making the change, the procedure goes back to the step S401 to receive a next input from the user.

The information necessary for the execution of the addition command or the deletion command is a line number in the monitor program 102 which is to be added or to be deleted. The information for the modification information may be a line number to be modified and a new line to replace an old line.

In this manner, the input interpreting unit 231 and the rewrite processing unit 233 which operate in accordance with the addition command, the deletion command, or the modification command provide the function of the rewrite processing unit 143 of FIG. 3. Hence, a change can be made on the content of the monitor program 102 through the interaction function.

If it turns out at the step S402 that the input is not about making a change in the monitor program 102, the procedure goes to a step S404. At the step S404, a check is made whether the input is the editor-activation command. If it is, the procedure goes to a step S405.

At the step 405, the editor processing unit 240 is activated by the editor-activation unit 234, which operates based on a result of the check made at the step S404.

In this manner, the input interpreting unit 231 and the editor activation unit 234 provide the function of the editing activation unit 144 of FIG. 3. Also, the editor processing unit 240 operates as the editing processing unit 104 of FIG. 3. Thus, the content of the monitor program 102 can be edited by using the editor processing unit 240 in an interactive manner. Here, when the editor-activation unit 234 activates the editor processing unit 240, information regarding the current state is preserved. When the editor processing unit 240 finishes its operation, the original state is recovered before the procedure goes back to the step S401.

If it turns out at the step S404 that the input is not about using the editor processing unit 240, the procedure goes to a step S406. At the step S406, a check is made whether the input is the restart command. If it is, the procedure goes to a step S407. Otherwise the procedure goes back to the step S401.

At the step S407, the flag control unit 232 is activated by the input interpreting unit 231 so as to clear the halt flag 216 of the switching processing unit 210. Here, the flag control unit 232 operates as the clearing unit 141 of FIG. 3

At a step S408, the input interpreting unit 231 instructs the state recovering unit 214 of the switching unit 210 to recover the state of the program execution. The state recovering unit 214 fetches the content of the state preserving unit 213, and stores it to the program counter 221. Thus, the content of the program counter 221 indicates a line to be executed in the main program 101. This is the end of the interaction process.

Since the state of the program execution is restored at the step S408, the step S401 of FIG. 8 can be carried out after the end of the interaction process. That is, the execution of the main program 101 can be resumed.

In this manner, the input interpreting unit 231 controlling the flag control unit 232 and the state recovering unit 214 provides the functions of the clearing unit 141 and the third switching unit 142 of FIG. 3. Thus, the main program 101 can be resumed from a point where it has been stopped by the halt instruction. When one line is executed after the restart of the main program 101, the monitor program 102 on which the change has been made will be executed.

In the following, a process of executing a command entered through the interaction function will be described.

FIG. 11 shows a block diagram of a fourth embodiment of the interpreter language processing device according to the second principle. The second embodiment of the interpreter language processing device is implemented on a computer system. In FIG. 11, the same elements as those in FIG. 9 are referred to by the same numerals, and a description thereof will be omitted.

In FIG. 11, the user-interface processing unit 230 of the interpreting language processing device includes an instruction setting unit 235 in addition to the elements of FIG. 9. The instruction setting unit 235 sets the instruction entered by the user to the interpreting processing unit 220 in accordance with a command given by the user. Here, the instruction setting unit 235 may set the instruction to an instruction register of the interpreting processing unit 220. In this case, the input interpreting unit 231 may send to the instruction setting unit 235 the instruction which is entered by the user along with the immediate-execution command. Then, the instruction setting unit 235 can set the instruction as described above.

Figure 12:
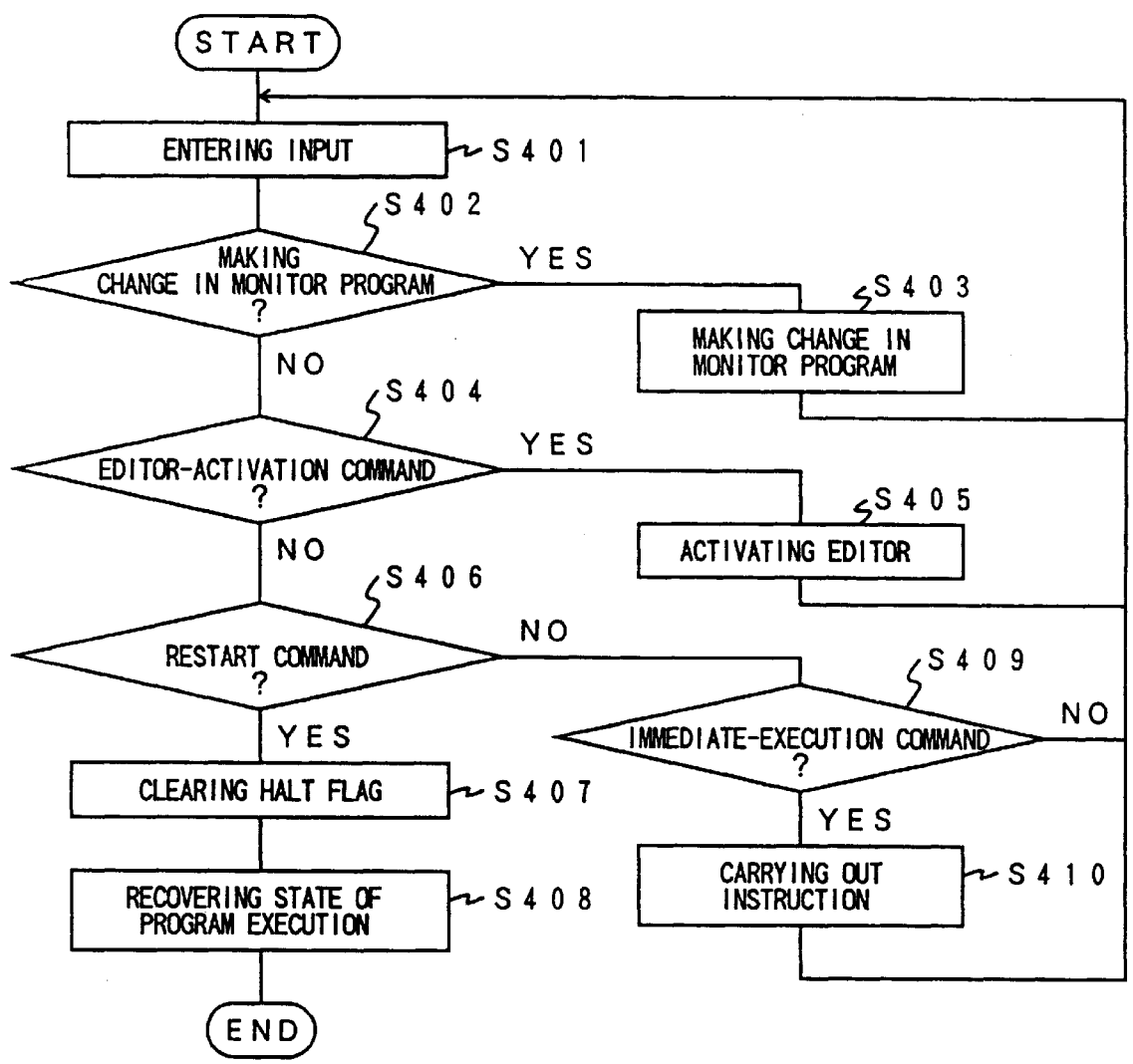
FIG. 12 is a flowchart of a process of the interpreter language processing device of FIG. 11.

FIG. 12 shows a flowchart of a process of the user-interface processing unit 230. In FIG. 12, the steps S401 through S408 are the same as those of FIG. 10, and a description thereof will be omitted.

In FIG. 12, if it turns out at the step S406 that the input is not the restart command, the procedure goes to a step S409. At the step S409, a check is made whether the input is the immediate-execution command. If it is not, the procedure goes back to the step S401, where the next input is entered. If the input is the immediate-execution command, the procedure goes to a step S410.

At the step S410, the instruction which is entered along with the immediate-execution command is set to the instruction register of the interpreting processing unit 220. Also, at the step S410, the user-interaction function is terminated.

Since the user-interaction function is terminated, the procedure goes to the step S301 of FIG. 8. At the step S301, the instruction in the instruction register which has been set at the step S410 of FIG. 12 is executed as if the execution is a continuation of the monitor program 102.

In this manner, the input interpreting unit 231 and the instruction setting unit 235 operating based on the immediate-execution command and the entered instruction provides the function of the instruction sending unit 145. Thus, the instruction entered by the user can be immediately executed.

When the instruction is executed at the step S301 after the end of the user-interaction function, the program counter 221 must indicate the end of the monitor program 102. Thus, the procedure goes to the step S309 of FIG. 8 by going through a check made at the step S306.

At the step S309, a check is made if the halt flag 216 is set or not. In this case, the halt flag 216 is set since the processes of the steps S407 and S408 for returning to the main program 101 have not been carried out yet. Thus, the procedure goes to the step S310, where the user-interaction function is activated again.

Accordingly, at least one instruction can be executed as a one-shot monitor program while the main program 101 is stopped. The execution of this one instruction can be carried out by entering the immediate-execution command and the instruction through the user-interaction function.

Figure 13:
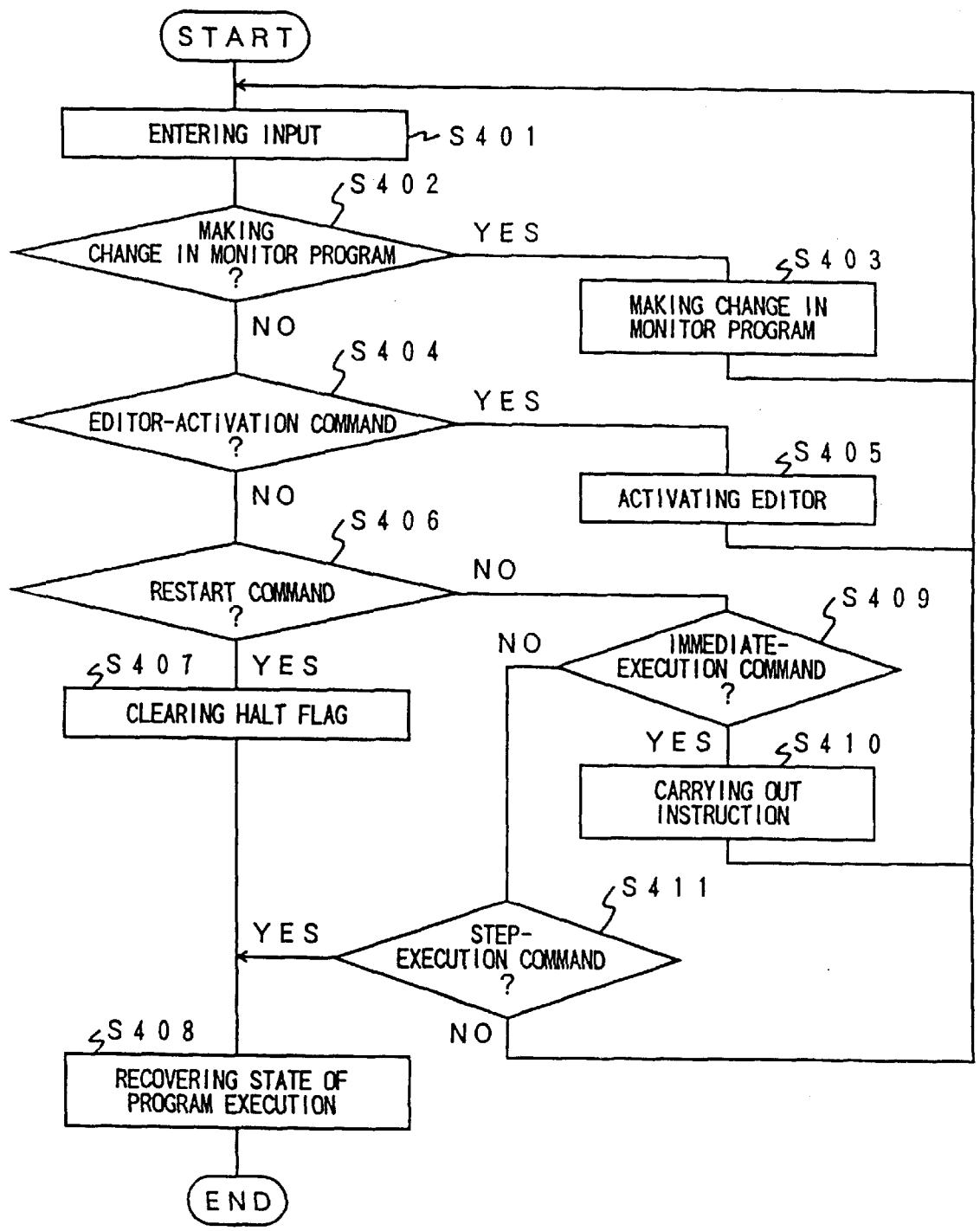
FIG. 13 is a flowchart of another process of the interpreter language processing device of FIG. 11.

FIG. 13 shows a flowchart of a process of the user-interface processing unit 230, where an additional process function is provided. In FIG. 13, the steps S401 through S410 are the same as those of FIG. 12, and a description thereof will be omitted.

The additional function provided in FIG. 13 is that of executing the main program 101 step by step, i.e., one line of the main program 101 is executed and halted. This is done by utilizing the user-interaction function, in which the input interpreting unit 231 responding to a step-execution command makes the state recovering unit 214 recover the state, but does not clear the halt flag 216.

In FIG. 13, if it turns out at the step S409 that the input is not the immediate-execution command, the procedure goes to a step S411. At the step S411, a check is made whether the input is the step-execution command. If it is not, the procedure goes back to the step S401 to wait for another command to be given by the user. If the input is the step-execution command, the procedure goes to the step S408. Thus, the state of the program execution is recovered for the main program 101, and the process of the user-interaction function is finished.

In this manner, the input interpreting unit 231 responding to the step-execution command restores the state of the program execution for the main program 101 without clearing the halt flag 216. Thus, the function of the fourth switching unit 146 is provided.

After the end of the user-interaction function, one line of the main program 101 is executed at the step S301 of FIG. 8. Then, the program execution is switched from the main program 101 to the monitor program 102. When the execution of the monitor program 102 is finished, the procedure goes to the step S309. Since the halt flag 216 was not cleared at the end of the user-interaction function, a check as to whether the halt flag 216 is set returns an affirmative answer. Thus, the procedure goes to the S310 to activate the user-interaction function again.

Accordingly, one line of the main program 101 is executed and halted. By entering the step-execution command repeatedly, each line of the main program 101 can be executed one after another.

Also, the step-execution function can be combined with the immediate-execution function to provide a debugging procedure for a highly detailed analysis of the main program 101. That is, each time one line of the main program 101 is executed, appropriate commands may be entered to obtain various information about the execution of the main program 101.

As described above, the present invention provides an efficient debugging environment so that an amount of time necessary for the development of application programs using an interpreter language can be significantly reduced.

According to the first principle of the present invention, the monitor program is written in the same interpreter language as that of the main program. Thus, the work load of the programmers is reduced. Also, various functions provided for the interpreter language makes it possible to carry out detailed debugging analysis of complex programs.

According to the second principle of the present invention, the user-interface function provides such functions as making a change in the monitor program, carrying out an instruction based on the immediate-execution command, and executing the main program step by step. Thus, a user-friendly debugging environment is provided so as to enhance the efficiency in the program development.

Further, the present invention is not limited to these embodiments, but various variations and modifications may be made without departing from the scope of the present invention.

What is claimed is:

1. A device for executing a main program written in an interpreter language, said device comprising:
   processing means for executing a program written in said interpreter language;
   a monitor program which is written in said interpreter language for monitoring an execution of said main program;
   first switching means for switching said processing means from executing said main program to executing said monitor program after an execution of one execution unit of said main program;
   second switching means for switching said processing means from executing said monitor program to executing said main program after an execution of said monitor program;
   user-interface processing means for providing an interactive interface between said device and a user, said user-interface processing means being activated after said execution of said monitor program if a halt instruction is executed during said execution of said monitor program;
   wherein said processing means comprises:
   instruction processing means for executing instructions of said main program; and
   halt-instruction processing means for sending a halt message when a halt instruction in said monitor program is executed by said instruction processing unit,
   and wherein said second switching means comprises:
   holding means for receiving and holding said halt message;
   switching processing means for switching said processing means from executing said monitor program to executing said main program in the absence of said halt message in said holding means; and
   a interaction-activation means for activating said user-interface processing means after said execution of said monitor program in the presence of said halt message in said holding means.

2. The device as claimed in claim 1, wherein said second switching means further comprises check means for notifying said switching processing means of said absence of said halt message or for notifying said interaction-activation means of said presence of said halt message, depending on whether said halt means holds said halt message.

3. The device as claimed in claim 1, wherein said one execution unit comprises one line of said main program.

4. The device as claimed in claim 3, wherein said processing means further comprises line-check means for obtaining a line number of a line of said main program and for sending said line number to said instruction processing means when said instruction processing means executes a line-check instruction during said execution of said monitor program, said line being executed by said processing means immediately before said execution of said monitor program, so that said instruction processing means can check if said line-number is a predetermined line number.

5. The device as claimed in claim 1, wherein said processing means further comprises substitution-detection means for obtaining identification information about a variable used in said main program and for sending said identification information to said instruction processing means when said instruction processing means executes a substitution-detection instruction during said execution of said monitor program, said variable having a value changed by said processing means immediately before said execution of said monitor program, so that said instruction processing means can check if a value of a predetermined variable is changed.

6. The device as claimed in claim 1, wherein said user-interface processing means further comprises:
   clearing means for clearing said holding means to purge said halt message when a restart instruction is given by said user;
   third switching means for switching said processing means from executing said monitor program to executing said main program and for making said processing means restart execution of said main program in response to said restart instruction.

7. The device as claimed in claim 1, wherein said user-interface processing means further comprises rewrite means for making a change in said monitor program in response to a modification command given by said user.

8. The device as claimed in claim 1, further comprising editing processing means for editing said monitor program.

9. The device as claimed in claim 8, wherein said user-interface processing means further comprises editing-activation means for activating said editing processing means in response to an editor-activation command given by said user.

10. The device as claimed in claim 1, wherein said user-interface processing means further comprises instruction sending means for sending at least one instruction to said processing unit in response to an immediate-execution command and said at least one instruction given by said user, so that said processing unit executes said at least one instruction.

11. The device as claimed in claim 1, wherein said user-interface processing means further comprises a fourth switching means for switching said processing means from executing said monitor program to executing said main program and for making said processing means restart execution of said main program in response to a predetermined execution command given by said user, wherein said holding means keeps holding said halt message so as to halt said main program after said execution of said one execution unit.

* * * * *